United States Patent [19]

Thun

[11] 4,114,457
[45] Sep. 19, 1978

[54] APPARATUS FOR ULTRASONIC MEASUREMENT

[75] Inventor: Niels Thun, Sonderborg, Denmark

[73] Assignee: Danfoss A/S, Nordborg, Denmark

[21] Appl. No.: 809,172

[22] Filed: Jun. 23, 1977

[30] Foreign Application Priority Data

Jul. 1, 1976 [DE] Fed. Rep. of Germany ....... 2629562

[51] Int. Cl.² ............................................. G01N 29/00
[52] U.S. Cl. ..................................................... 73/632
[58] Field of Search ................. 73/67.7, 67.8 R, 67.9, 73/67.5 R, 71.5 US, 632

[56] References Cited

U.S. PATENT DOCUMENTS

| 2,416,337 | 2/1947 | Mason | 73/67.7 |
| 3,855,847 | 12/1974 | Leschek | 73/71.5 US |
| 3,884,325 | 5/1975 | Cowles | 73/67.8 R |
| 3,916,373 | 10/1975 | Schroder | 73/71.5 US |

Primary Examiner—Stephen A. Kreitman
Attorney, Agent, or Firm—Wayne B. Easton

[57] ABSTRACT

The invention relates to an ultrasonic measurement circuit of the type having an ultrasonic converter connected by a line to a transmission pulse generator. The circuit may have two transducers which operate alternately as a transmitter and a receiver and, in this case, the circuit also has a receiver amplifier. A resistor for preventing reflections is provided in the line between the pulse generator and the ultrasonic transducer which resistor is adapted to the wave resistance of the line. The pulse generator is shunted by a branch line having a switching device which becomes conductive at the end of the transmission impulse.

8 Claims, 3 Drawing Figures

APPARATUS FOR ULTRASONIC MEASUREMENT

The invention relates to a device for ultrasonic measurement, comprising at least one ultrasonic transducer serving as a transmitter and connected by a line to a transmission impulse generator which emits transmission impulses. Such devices are often used, for example, for the ultrasonic measurement of the speed of fluent media.

An ultrasonic measuring device is known in which two ultrasonic transducers are provided which operate alternately as a transmitter and receiver. They are associated with a common transmission impulse generator and a common receiver amplifier to which the converters are alternately galvanically conductively connected by way of a line, particularly a cable.

An ultrasonic measuring device is also known in which a single ultrasonic transducer serves as a transmitter and receiver. Whereas the connection of transducer to the transmission impulse generator is by way of a direct line, a transformer, an intermediate circuit and a second transformer are interposed between the converter and the receiver amplifier. In the intermediate circuit there is a ring modulator which is equipped with diodes and which can be blocked with the aid of an impulse applied to central tappings of the intermediate circuit-transformer windings.

The invention is based on the problem of providing a device of the aforementioned kind in which the voltage at the ultrasonic transducer is better adapted to the transmission impulse than hitherto.

This problem is solved according to the invention in that a terminal resistor is in series between the line and the transmission impulse generator, which resistor is adapted to the wave resistance of the line, and the transmission impulse generator is shunted by a branch line comprising a first switching device which becomes conductive at the end of the transmission impulse.

This circuit construction is based on the discovery that an ultrasonic transducer has an impedance which is difficult to describe, so that unavoidable reflections occur. These reflections were hitherto again reflected in the vicinity of the transmission impulse generator, whereupon the doubly reflected wave was superimposed on the voltage applied to the transducer. This led to a voltage at the ultrasonic transducer that not only exhibits the unavoidably inclined rising flank as compared with the rectangular transmission impulse but subsequently has a very disturbed course, as will be explained in detail in conjunction with FIG. 1. This leads to a very uneven excitation of the crystal in the transducer and thus to a non-uniform delivery of the ultrasonic signal.

In the present circuit, a terminal resistor is provided on the side of the transmission impulse generator, which resistor prevents reflections because it is adapted to the wave resistance of the cable. Consequently, no harm is done by the fact that a reflection occurs at the ultrasonic transducer. By reason of the missing second reflection, the voltage at the transducer cannot be detrimentally influenced by reflected waves. However, in order that the terminal resistor may also be effective at the end of the transmission impulse to prevent undesired post-excitation of the transducer by reflections, the parallel-connected branch line is provided which can be made effective by the first switching device.

If the ultrasonic transducer also serves as a receiver, it is recommended that a time element be used which terminates the conductive state of the first switching device before commencement of the receiving operation.

In this connection it is recommended that the first switching device can be gradually brought from the conducting to the blocking state. This leads to the effectiveness of the terminal resistor becoming gradually less. One therefore avoids sudden switching off which could lead to undesirably steep signal fronts.

The transmission impulse generator may comprise a first capacitor chargeable by way of a preliminary resistor to the feed voltage, in series with a switching element operable by a transmission control impulse. Discharging of the capacitor through the switching element is generally so short that one can expect to obtain a practically rectangular transmission impulse.

The first switching device is preferably formed by a first diode loaded by the transmission impulse in the blocking direction, and there is provided in parallel with the first diode a current generator which is in series with a second diode and which sends a current through the first diode in the pass direction following the transmission impulse. As long as the transmission impulse is provided, the first diode is blocked, the second diode protecting the current generator. Upon termination of the transmission impulse, the first diode is then brought to a conductive state in that it allows the reflected voltages of both polarities to pass.

Further, the current generator may be formed by a coil in the discharge circuit of a second capacitor which is chargeable to the feed voltage by way of a preliminary resistor and which is closed by means of a second switching element operable by the feed control signal. This second capacitor discharges during delivery of the transmission impulse through the coil. The coil currrent subsequently flows through the two diodes, whereby the first diode is kept in the conductive state. Since the coil current reduces gradually, a gradual transition to the blocking state is obtained at the end of the desired pass period.

In addition, the line can be connected to the terminal resistor and the transmission impulse generator by way of a transformer. This results in galvanic separation of the transducer from the rest of the device and thus better safety. Under certain circumstances, the transformer ratio can also be used to adapt the terminal resistor to the wave resistance. By means of a third transformer winding, a capacitor could also be connected as a terminal load to take into account non-ohmic components of the wave resistance of the line.

Further, the transformer may have a third winding by way of which a receiver amplifier is connected, with the interpositioning of an intermediate circuit, to a second switching device which is brought to the conductive state on receiving operation, and of a second transformer which adapts the input resistance of the receiver amplifier to the wave resistance of the line. In this way the receiver amplifier does not constitute a hindrance to the adapted terminal resistor during transmission operation, i.e. when the switching position is blocked. Upon receiving operation, however, when the terminal resistor is switched off, the input resistance of the intermediate amplifier adapted by the second transformer forms a terminal resistor which even in this manner of operation prevents reflections that could detrimentally influence the receiving result.

In this connection it is favourable if in the intermediate circuit the associated windings of the first and second transformer are each associated with a capacitor to form parallel oscillatory circuits tuned to the receiving frequency. By reason of this parallel oscillatory circuit one obtains particularly good damping. The second transformer can have the least possible turns.

To form the second switching device, third and fourth diodes may be included in the connecting lines between the ends of the windings of the first and second transformer associated with the intermediate circuit, the anodes of the third and fourth diodes facing the same winding, and the central tappings of both windings may each be connected by a preliminary resistor to one feed line and one central tapping may be connected to the other feed line by way of a third switching element which is operated by a receiving control signal. When the switching element is blocked during the transmission operation, the diodes are also blocked. If, however, it is brought to the conductive state during receiving operation, the diodes can also transmit the signals received.

When two ultrasonic transducers are provided which alternately act as generator and receiver, two transmission impulse generators should be provided with the associated terminal resistor and first switching device and two intermediate circuits with associated second switching device but a common second transformer and receiver amplifier. With the aid of a control device, the transmission impulse generator and the first switching device of the one ultrasonic converter can then be actuated for the transmission operation and the second switching device for the other ultrasonic transducer be brought to the conductive state for receiving operation. During the next cycle, the individual components are operated conversely.

The invention will now be described in more detail with reference to the examples shown in the drawing, wherein.

Figure 1:
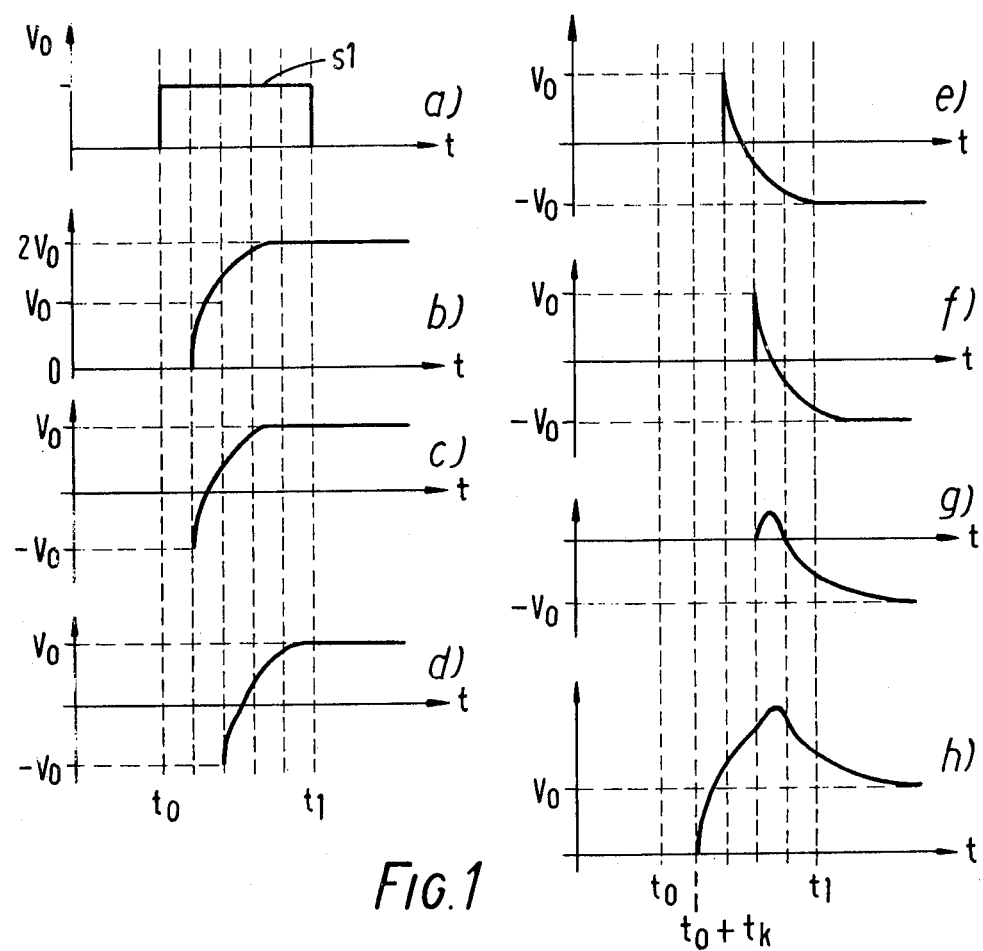
FIG. 1 illustrates the voltage ratios between the transmission impulse generator and ultrasonic transducer upon reflection.

In FIG. 1, the voltage is shown at different positions and at different instances against time so as to explain the reflection phenomenon in more detail. In diagram a, a transmission impulse s1 of rectangular form is shown which is given off by the transmission impulse generator at a voltage $V_o$. Diagram b shows the shape given to the wave when striking the transducers. One obtains a less steeply rising flank and a maximum voltage of about 2 $V_o$. Such an impulse shape is not desired at the transducer.

By reason of the impedance of the crystal in the transducer, a reflected wave is obtained of the kind shown in diagram c. The reflected wave has a negative peak at − $V_o$ and then later again reaches the value of + $V_o$. Some time after, this wave reaches the signal generator as is shown in diagram d. According to the invention, a reflection is no longer possible at this position because of the presence of the terminal resistor.

Hitherto, however, there was repeated reflection. Diagram e shows a reflection for a transmission impulse generator with a negligibly small internal resistance. This wave again wanders towards the ultrasonic converter as is shown in diagram f. This reflected wave leads to the voltage at the converter as is shown in diagram g. Since this voltage is superimposed on the original curve, the voltage form shown in diagram h is obtained at the converter it being evident that this has a non-uniform course. This detrimentally influences the production of accurate ultrasonic signals. By way of example it may be stated that at an ultrasonic frequency of 1 MHz, the duration of the transmission impulse s1, i.e. the time $t_1 - t_o$, is about $0.5 \times 10^{-6}$ seconds and the running time $t_k$ in the line is about $0.1 \times 10^{-6}$ seconds.

Figure 2:
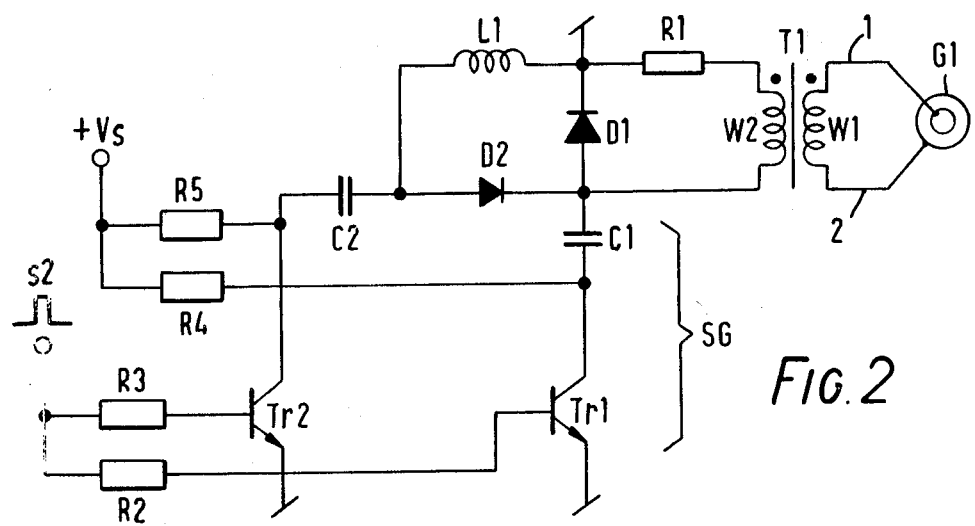
FIG. 2 is a simplified circuit diagram for an ultrasonic transducer operating as a transmitter.

In the example of FIG. 2, an ultrasonic transducer G1 is connected by lines 1, 2 to the winding W1 of a transformer T1. The winding W2 of this transformer is in series with a terminal resistor R1. The circuit is completed by a transmission impulse generator SG which consists of the series circuit of a condenser C1 and a transistor Tr1. This transmission impulse generator is shunted by a diode D1 which forms a first switching device. The diode D1 lies in a circuit comprising a coil L1 and a second diode D2. Between these two elements, the series circuit of a condenser C2 and a transistor Tr2 is branched off. The two transistors Tr1 and Tr2 are operated by way of preliminary resistors R2 and R3 by a transmission control impulse s2, on the occurrence of which they become conductive. The two capacitors C1 and C2 are charged by way of preliminary resistors R4 and R5 by the feed voltage + $V_s$, the charging circuit being completed by way of the diode D1 or the diodes D1 and D2.

This leads to the following manner of operation: During intervals, the capacitors C1 and C2 are charged to the feed voltage $V_s$. When a transmission control impulse s2 occurs and the transistor Tr1 becomes conductive, the capacitor C1 discharges through the collector-emitter path of the transistor Tr1, the terminal resistor R1 and the winding W2 of the transformer T1. Accordingly, a substantially rectangular impulse is transmitted to the ultrasonic transducer 1 so that its crystal is excited to produce ultrasonic oscillations. Since the terminal resistor R1 is adapted to the wave resistance of the line 1, 2, a wave reflected by the transducer G1 is received by the terminal resistor R1 without any renewed reflection. Simultaneously with the transistor Tr1, the transistor Tr2 also became conductive. Consequently the capacitor C2 discharges through the collector-emitter path of the transistor Tr2 and the coil L1. When the transistor Tr2 blocks at the end of the transmission impulse, the coil L1 maintains the current flowing through it. It flows through the diodes D2 and D1. Consequently the diode D1 that was up to this time held in the blocked condition by the transmission impulse s1 becomes conductive. The winding W2 is therefore again closed by the terminal resistor R1. Any reflected waves that may now occur are therefore not thrown back. Since the coil current is reduced gradually, the transmissibility of the diode D1 also drops. The terminal resistor R1 is gradually faded out instead of being switched off suddenly. Finally, the loop containing the winding W2 is open. It does therefore not constitute a load for subsequent receiving operation.

Figure 3:
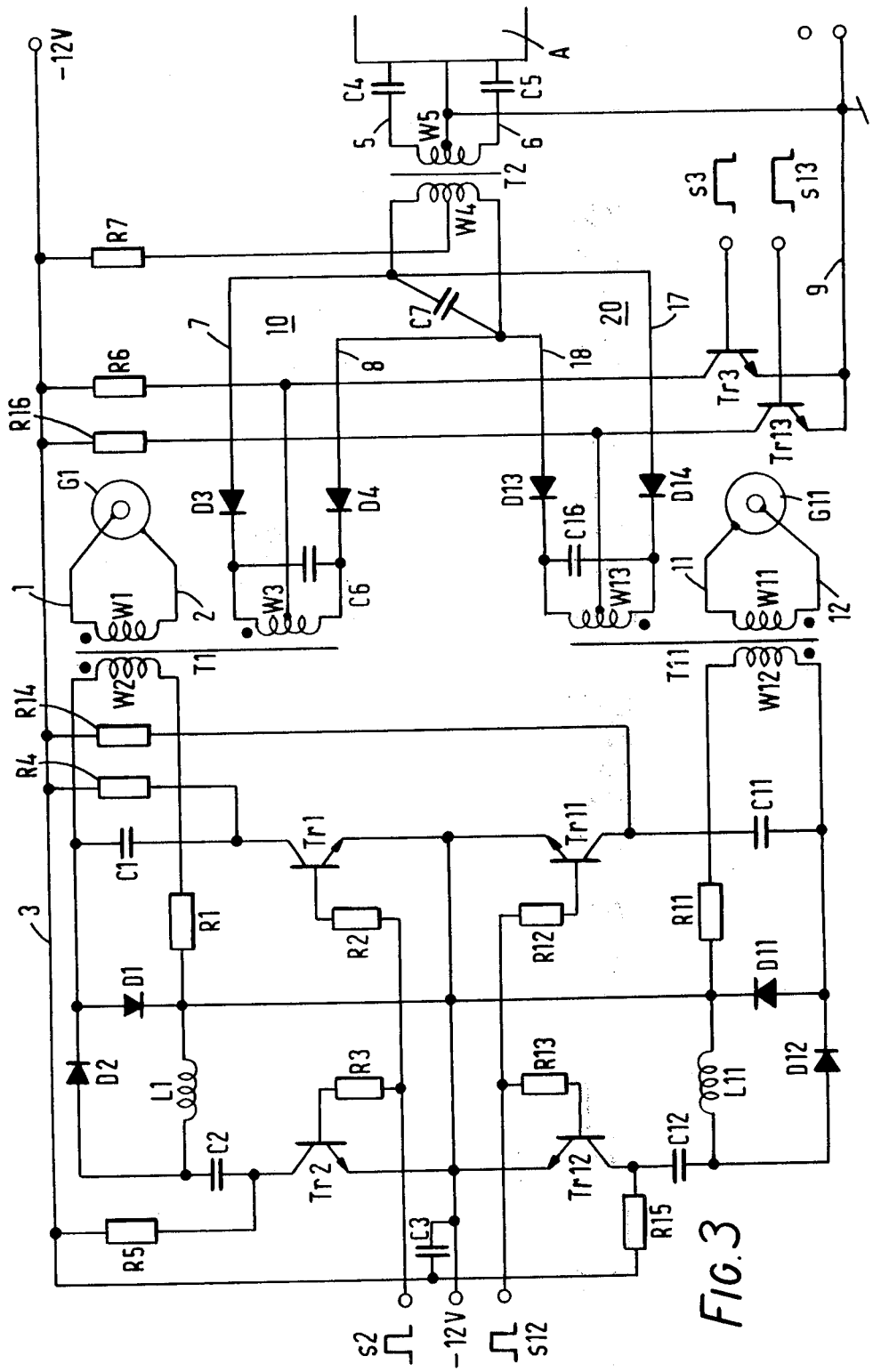
FIG. 3 is a circuit for two ultrasonic transducers alternately operative as transmitter and receiver.

FIG. 3 shows two ultrasonic transducers G1 and G11. The first ultrasonic transducer G1 is associated with the FIG. 2 elements for transmission operation. The second ultrasonic transducer G11 is associated with light elements for transmission operation and indicated by reference numerals that are increased by 10. A voltage of + 12 V is applied through a feed line 3 and a voltage of − 12 V through a second feed line 4, so that a feed voltage of 24 V is available. A smoothing capacitor C3 is provided between the two lines. The transmission control signals s2 and s12 are supplied alternately.

For receiving operation of the ultrasonic transducer, the transformer T1 has a third winding W3 which forms part of an intermediate circuit comprising the winding W4 of a transformer T2, of which the second winding W5 is an earthed central tapping, and two signal lines 5 and 6, each equipped with a capacitor C4 and C5, are connected to a receiver amplifier A. The two windings W3 and W4 are interconnected by lines 7 and 8, each containing a diode D3 and D4 of which the anodes face the same winding. A central tapping of the winding W3 is connected by way of a preliminary resistor R6 to the feed line 3 and by way of a transistor Tr3 to the earthed zero conductor 9. The central tapping of the winding W4 is connected by way of a preliminary resistor R7 to the feed line 3. The winding W3 is in parallel with a transducer C6 and the winding W4 in parallel with a capacitor C7. For receiving operation of the ultrasonic converter C11, a corresponding intermediate circuit 20 is provided with the same components of which the reference numerals are increased by 10, only the winding W4 and the capacitor C7 being common to the intermediate circuit 10.

When the ultrasonic transducer G1 is to work as a receiver, a receiving control signal s3 is applied to the base of the transistor Tr3. The transistor Tr13 is blocked because no receiving control signal s13 is applied to it. The current through the transistor Tr3 consists of a first partial current which flows through the resistor R6 and can be kept small by correspondingly large dimensioning of this resistor, and a second partial current which flows through the resistor R7, the two halves of the winding W4, the two diodes D3 and D4 and the two halves of the winding W3. Consequently, receiving signals transmitted in the transformer T1 can be transmitted through the intermediate circuit 10 and the transformer T2 to the receiver amplifier A. When the receiving control signal s3 finishes, i.e. when the transistor Tr3 blocks, the diodes D3 and D4 also block so that no signals can be transmitted from the winding W3 through the intermediate circuit 10. The pairs of diodes D3 and D4 or D13 and D14 therefore form switching devices which are controllable by the associated transistors Tr3 or Tr13.

A main control device ensures that during operation the transmission control signal s2 occurs only if the receiving control signal s13 is present and, conversely, the transmitting control signal s12 only when the receiving control signal s3 is present.

The following may be mentioned in connection with dimensioning the individual components. The wave resistance $Z_0$ of a conventional pair of lines 1, 2 formed as a cable can be regarded as being predominantly ohmic and is generally between 60 and 160 ohm. With a 75 ohm cable and a transmission ratio for the windings W1 and W2 in the transformer T1 of 1:1, the terminal resistor R1 should likewise have a value of 75 ohm. Should an adaptation of the blind resistance also be required, this can be achieved by correspondingly selecting the condenser C6 parallel to the winding W3. It is not necessary that the adaptation be very accurate because a partial suppression of the reflection will already produce marked improvements. The condensers C6, C7 and C16 in the intermediate circuit can be selected so that they form oscillatory circuits together with the associated windings W3, W4 and W13, the resonance frequency of the oscillatory circuits substantially corresponding to the receiving frequency of the converters G1 and G11. The input resistance of the receiver amplifier A is generally fixed, for example 2500 ohm. The transmission ratio of the transformer T2 should therefore be about 1:6 for a 75 ohm cable.

I claim:

1. An ultrasonic measurement circuit, comprising a transmission line having source and load ends and first and second conductors, an ultrasonic transducer effectively between said conductors at said load end of said line, said transducer serving as a transmitter, signal generator means in said first conductor at said source end of said line having conductive and nonconductive states, impedance matching resistance means in said second conductor at said load end of said line, one way switching means shunting said conductors between the output side of said signal generator means and the upstream side of said resistance means, said one way switching means being poled towards said resistance means, and current generating means for effecting a current through said one way switching means during said nonconductive state of said signal generator means to make said impedance matching resistance means effective during said nonconductive state.

2. An ultrasonic measurement circuit according to claim 1 wherein said transducer also serves as a receiver, and a time element for terminating the conductive state of said signal generator means prior to commencement of the receiving operation.

3. An ultrasonic measurement circuit according to claim 1 including means for shifting said one way switching means from a conducting state to a blocking state.

4. An ultrasonic measurement circuit according to claim 1 wherein said signal generator means includes a capacitor and a switching element in series, said switching element having actuating means responsive to transmission control pulses.

5. An ultrasonic measurement circuit according to claim 1 wherein said one way switching means is a first diode loaded in the blocking direction during said conductive state of said signal generator means, said current generator means including inductance means and a second diode in series relative to each other and jointly in parallel to said first diode for making said first diode conductive at the end of said conductive state of said signal generator means.

6. An ultrasonic measurement circuit according to claim 5 including a discharge circuit having a second switching element and a second capacitor in series with said current means, said second switching element having actuating means responsive to transmission control pulses, said current generator including an element in the form of a coil.

7. An ultrasonic measurement circuit according to claim 1 including a transformer between said impedance matching resistance and said transducer.

8. An ultrasonic measurement circuit according to claim 7 including a receiving amplifier, a third winding for said transformer with a capacitor in parallel with said third winding, an intermediate circuit between said amplifier and said third winding, a second lead matching transformer between said amplifier and said intermediate circuit, a switching device between said third winding and said second transformer which is brought to the conducting state on receiving operation.

* * * * *